United States Patent [19]
Richman et al.

[11] Patent Number: 5,531,369
[45] Date of Patent: Jul. 2, 1996

[54] PROCESS FOR MAKING MACHINES RESISTANT TO CAVITATION AND LIQUID DROPLET EROSION

[75] Inventors: Roger H. Richman, Mountain View, Calif.; Osman T. Inal; Charles A. Zimmerly, both of Socorro, N.M.; Darel E. Hodgson, Palo Alto, Calif.

[73] Assignee: Electric Power Research Institute, Palo Alto, Calif.

[21] Appl. No.: 100,685

[22] Filed: Aug. 2, 1993

[51] Int. Cl.$^6$ .................................................. B23K 20/08
[52] U.S. Cl. ..................... 228/109; 228/2.5; 228/262.44; 228/107
[58] Field of Search .................................... 228/107, 108, 228/109, 2.5, 262.44

[56] References Cited

U.S. PATENT DOCUMENTS

| | | | |
|---|---|---|---|
| 4,010,965 | 3/1977 | Izuma | 228/102 |
| 4,747,350 | 5/1988 | Szecket | 228/108 |
| 4,759,906 | 7/1988 | Nenno | 420/463 |
| 4,842,182 | 6/1989 | Szecket | 228/109 |
| 5,259,542 | 11/1993 | Hardwick | 228/107 |

FOREIGN PATENT DOCUMENTS

| | | | |
|---|---|---|---|
| 0320773 | 6/1989 | European Pat. Off. | 228/107 |
| 1577094 | 5/1966 | Germany | 228/107 |
| 0010347 | 1/1978 | Japan | 228/107 |
| 0005803 | 1/1980 | Japan | 228/109 |
| 0923746 | 4/1963 | United Kingdom | 228/107 |

OTHER PUBLICATIONS

Heathcock et al., "Cavitation Erosion of Stainless Steels," *Wear*, vol. 81, pp. 311–327 (1982).

Samuels, L. E., "Mechanical Grinding, Abrasion, and Polishing," pp. 33–37, *Metals Handbook*, Ninth Edition: vol. 9, *Metallography and Micron structures, American Society for Metals*, Metals Park, Ohio (1985).

Carpenter, S. H., and Wittman, R. H., "Explosion Welding," *Ann. Rev. Materials Science*, vol. 5, pp. 177–199 (1975).

Crossland, B., Chapter 6, "Flat Plate Cladding," from *Explosive Welding of Metals and its Applications*, Clarendon Press, Oxford (1982).

Heathcock, C. J. et al., "The Influence of Microstructure on the Cavitation Erosion of Materials," pp. 219–224, *Proc. 5th Int'l Conf. on Strength of Metals and Alloys* (P. Haasen, V. Gerold, & G. Kostorz, eds.), Pergamon Press, Oxford, U.K. (1979).

Richman, R. H., and McNaughton, W. P., "Correlation of Cavitation Erosion Behavior with Mechanical Properties of Metlas," *Wear*, vol. 140, pp. 63–82 (1990).

Richman, R. H., and McNaughton, W. P., "Cyclic Deformation and Phase Transformation in Cavitation Erosion of Alloys," pp. 87–94, C453/051, *I. Mech. E.* (1992).

Richman, R. H. et al., "Cavitation Erosion of Two NiTi Alloys," *Wear*, vol. 157, pp. 401–407 (1992).

Richman, R. H., and McNaughton, W. P., "Fatigue Damage in Erosive Wear," pp. 383–397, *Proc. Morris E. Fine Symposium* (P. K. Liaw, J. R. Weertman, H. I. Marcus, and J. S. Santner, eds.), The Minerals and Materials Soc., Warrendale, Pa. (1991).

*Primary Examiner*—Kurt Rowan
*Assistant Examiner*—James Miner
*Attorney, Agent, or Firm*—Klarquist Sparkman Campbell Leigh & Whinston

[57] ABSTRACT

The method comprises explosively bonding a NiTi alloy to a steel workpiece formed in the shape of at least a portion of a desired hydraulic device. The nickel content of the NiTi alloy is sufficient to place the alloy substantially completely in the $\beta$ phase at or about room temperature. This nickel content is typically between about 55 weight percent to about 56 weight percent. The NiTi alloy is provided in the form of a strip having a thickness of from about 0.01 inch (0.25 mm) to about 1.0 inch (25 mm). After annealing, the NiTi alloy again is heated, to increase the ductility of the NiTi alloy. The NiTi alloy typically is maintained at this temperature and explosively bonded to the workpiece to cover at least a portion of the surface area with the NiTi alloy. The present invention also includes NiTi-metal composites made according to the process of the present invention. These NiTi-metal composites are superior for resisting cavitation erosion and LDE when compared to conventional materials.

24 Claims, 10 Drawing Sheets

LCS

NiTi

50 μm

LCS

NiTi

⊢——⊣
50 µm

LCS

NiTi

⊢——⊣
25 µm

LCS

NiTi

50 μm

LCS

NiTi

25 μm

LCS

NiTi

50 μm

LCS

NiTi

25 μm

LCS

NiTi $\overline{50\,\mu m}$

LCS

NiTi $\overline{25\,\mu m}$

PROCESS FOR MAKING MACHINES RESISTANT TO CAVITATION AND LIQUID DROPLET EROSION

FIELD OF THE INVENTION

This invention concerns a process for making a metal workpiece resistant to erosion by explosively welding NiTi alloys to the workpiece.

BACKGROUND OF THE INVENTION

Liquid droplet erosion (LDE) and cavitation erosion reduce the lifetime of industrial hydraulic machinery. Turbines, for example, include rotary engines having vanes that move through a liquid. The liquid erodes portions of the surfaces of the vanes and turbine housing that are contacted by the liquid. Industrial machines (such as turbines) are expensive, hence a need exists for making the machines more resistant to erosion of this type.

Cavitation erosion results from the growth and collapse of vapor cavities (bubbles) in a liquid due to dynamic pressure changes. The mechanism responsible for material loss as a result of LDE and cavitation erosion was poorly understood until recently. Over the last forty years, many attempts have been made to correlate material properties, or combinations of material properties, such as hardness, tensile strength, ductility, etc. with measured erosion. Unfortunately, these studies obtain good correlations only within narrow classes of materials having very similar structure. See, for instance, Heathcock et al., "Cavitation Erosion of Stainless Steels," *Wear* 81:311–327 (1982).

Hydraulic machines, such as hydroturbines and impellers, typically are made from plain-carbon structural steels and from stainless steel, such as CA6NM and Type 304L. Unfortunately, all of these steels also experience significant material loss when exposed to cavitation and LDE erosion. Hence, a need exists for developing materials that are superior to common structural materials for resisting erosion.

NiTi alloys also are known, as is the potential for such alloys to resist erosion. See, for instance, "The Influence of Microstructure on the Cavitation Erosion of Materials," *Proc. 5th Intl Conf. on Strength of Metals and Alloys,* (Oxford, UK:Pergamon Press, 1979). However, the surprisingly superior nature of certain NiTi alloys for resisting erosion was not known prior to the present invention. Moreover, a need exists for a method for producing erosion-resistant industrial machinery by plating structural materials, such as steel, with erosion resistant materials. However, known welding techniques often produce a welded material that is brittle. Thus, welding an erosion-resistant material to a structural material such as steel to form a composite structure may reduce the suitability of the composite for resisting erosion. Moreover, where only certain alloy compositions are erosion-resistant, fusion welding may vary the composition of the alloy, thereby reducing or eliminate the erosion-resistant capability of the composite structure. Thus, a need exists to (1) identify or develop new erosion-resistant materials, and (2) develop techniques for forming erosion-resistant industrial hydraulic machinery using the newly identified or developed erosion-resistant materials.

SUMMARY OF THE INVENTION

Prior to the present invention, it was not known that NiTi alloys, having a preferred nickel content of from about 55 to about 56 weight percent nickel, are surprisingly resistant to material loss resulting from LDE and cavitation erosion. However, NiTi alloys are expensive and it would be impractical to make industrial machinery entirely from NiTi. Hence, the present invention provides a method for making NiTi-clad metal workpieces that are surprisingly resistant to cavitation erosion and LDE relative to materials currently being used.

One embodiment of the present invention comprises explosively welding a NiTi alloy, having a nickel content of from about 55 weight percent to about 60 weight percent, to at least a portion of the surface area of a metal workpiece. The portion of the surface area covered by the NiTi alloy is that portion potentially exposed to cavitation and liquid droplet erosion. The nickel content and processing conditions for the NiTi alloy are selected so that the alloy is substantially completely in the parent ordered phase, referred to herein as the β phase, at or about the service temperature. The method may further comprise the step of annealing the NiTi alloy in an inert atmosphere or vacuum at a temperature of from about 600° C. to about 800° C. before it is explosively welded to the substrate. The annealing step preferably is carried out in a vacuum or in an inert atmosphere primarily to alleviate impurities that may result from oxidation of the NiTi alloy at elevated temperatures. The method may further comprise the step of heating the NiTi alloy to a temperature of from about 275° C. to about 325° C., in order to increase the ductility of the NiTi alloy. This temperature is maintained and the NiTi alloy is explosively bonded to a workpiece. Increased ductility appears to increase the weldability of the NiTi alloys.

More specifically, the method comprises providing a steel workpiece in the shape of at least a portion of a desired hydraulic device. A strip of NiTi alloy is provided that is substantially completely in the β phase at or about room temperature, which typically is between about 55 weight percent to about 60 weight percent nickel, more preferably between about 55 weight percent to about 56 weight percent. The NiTi alloy is annealed, preferably in a vacuum or an inert atmosphere, so that the alloys are substantially completely in the ordered β phase. The NiTi alloys are annealed at a temperature of from about 675° C. to about 725° C., more preferably about 700° C., for a period of time of from about ten minutes to about fifteen minutes. The annealing step occurs before the NiTi alloy is explosively bonded to the workpiece. The NiTi alloy then is heated to a temperature of from about 275° C. to about 325° C., more preferably about 300° C., to increase the ductility of the NiTi alloy. The NiTi alloy is maintained at this temperature and explosively bonded to a metal workpiece.

A parallel welding arrangement is a preferred arrangement for explosively bonding the NiTi alloys to steel workpieces. A particularly suitable explosive is a mixture of ammonium nitrate and 6% fuel oil (ANFO), although any suitable explosive known to those of skill in the art of explosive welding is within the scope of this invention. The following parameters presently are the best parameters for achieving a good weld between the NiTi sample and the metal workpiece: frame height=1.75 inches (44.5 mm); stand-off distance=0.125 inch (3.18 mm); detonation velocity=2,200 m/sec; welding velocity=440 m/sec; and collision angle=11.5 degrees.

The present invention also is directed to NiTi-metal workpieces made according to the process of the present invention. These NiTi-metal workpieces have good bonds between the NiTi alloy and the metal workpiece. The bond morphology can be selected, i.e., a wavy or flat-bond interface can be produced, by varying the bonding parameters. The NiTi alloy does not undergo a phase transition during the bonding process, and therefore retains the ordered β phase. Without limiting the invention to one theory of operation, the ability of the NiTi alloys to deform from the ordered β phase to the martensite phase and back to the β phase apparently is responsible for the surprising resistance of the NiTi alloy to cavitation erosion and LDE. Hence, NiTi-metal workpieces according to the present invention are as resistant to cavitation erosion and LDE as the NiTi alloy is before it is explosively bonded to a metal workpiece.

An object of the present invention is to describe materials that are superior for resisting material loss as a result of cavitation erosion and LDE compared to materials commonly used to produce hydraulic machinery.

Another object of the present invention is to provide a method for making NiTi-plated workpieces that are resistant to cavitation erosion and LDE.

A first feature of the present invention is using NiTi alloys having a nickel content of from about 55 weight percent to about 60 weight percent as erosion-resistant materials.

Another feature of the present invention is a method for explosively bonding NiTi alloys to a steel workpiece.

An advantage of the present invention is the surprising resistance to cavitation erosion and LDE conferred to a workpiece by explosively bonding NiTi alloy to the workpiece.

DETAILED DESCRIPTION OF THE PREFERRED EMBODIMENTS

The present invention concerns a process for making industrial machinery erosion resistant by explosively welding NiTi alloys to metal workpieces. The present invention is primarily concerned with steel workpieces such as industrial hydraulic machinery including, without limitation, hydroturbines, seats on valves, pump impellers, casings and related devices. However, one skilled in the art will realize that workpieces other than industrial hydraulic machinery can be plated with NiTi alloys according to the method of this invention. NiTi-plated steel workpieces exhibit surprisingly high resistance to erosion. The steel provides structural support and the NiTi alloy provides cavitation and liquid droplet resistance.

I. NiTi Alloy

NiTi is a nearly equiatomic intermetallic alloy of Ni and Ti. The term equiatomic means that the relative atomic amounts of Ni and Ti are substantially equal. However, the relative amounts of nickel may vary alloys according to the present invention from about 55 weight percent to about 60 weight percent, and as discussed in more detail below, more preferably from about 55 to about 56 weight percent. An intermetallic compound is an intermediate phase in an alloy system, having a narrow range of homogeneity and relatively simple stochiometric proportions, in which the nature of the atomic binding can vary from metallic to ionic. "Metals Handbook," Vol. 1, p. (199__). At room temperature, the NiTi intermetallic alloys of the present invention are ductile, impact resistant and possess unique vibration damping properties.

The NiTi alloys may exist in at least two important phases, the parent or β phase, and the martensite phase. The crystal structure of the high-temperature β phase is the CsCl (B2) structure. The martensite phase is a monoclinic B19' structure. Which phase the NiTi alloy exists in is determined both by the relative amounts of Ni and Ti and the temperature. As the temperature changes, the NiTi alloys undergo phase transformations. The alloys occupy different space groups at each phase. The type of transformation that the NiTi intermetallic undergoes is dependent upon the alloy composition and prior thermomechanical treatment.

The NiTi alloys also are classified as shape memory alloys, apparently because the NiTi intermetallic undergoes a thermoelastic martensitic phase transformation. Without limiting the invention to one theory, certain NiTi alloys transform, in response to a stress impingement from a liquid droplet or cavitation, from the ordered β phase to the martensite phase and back to the β phase. Without limiting the present invention to one theory of operation, these transformations apparently are responsible for the surprising resistance to erosion exhibited by NiTi alloys according to the present invention.

Figure 1:
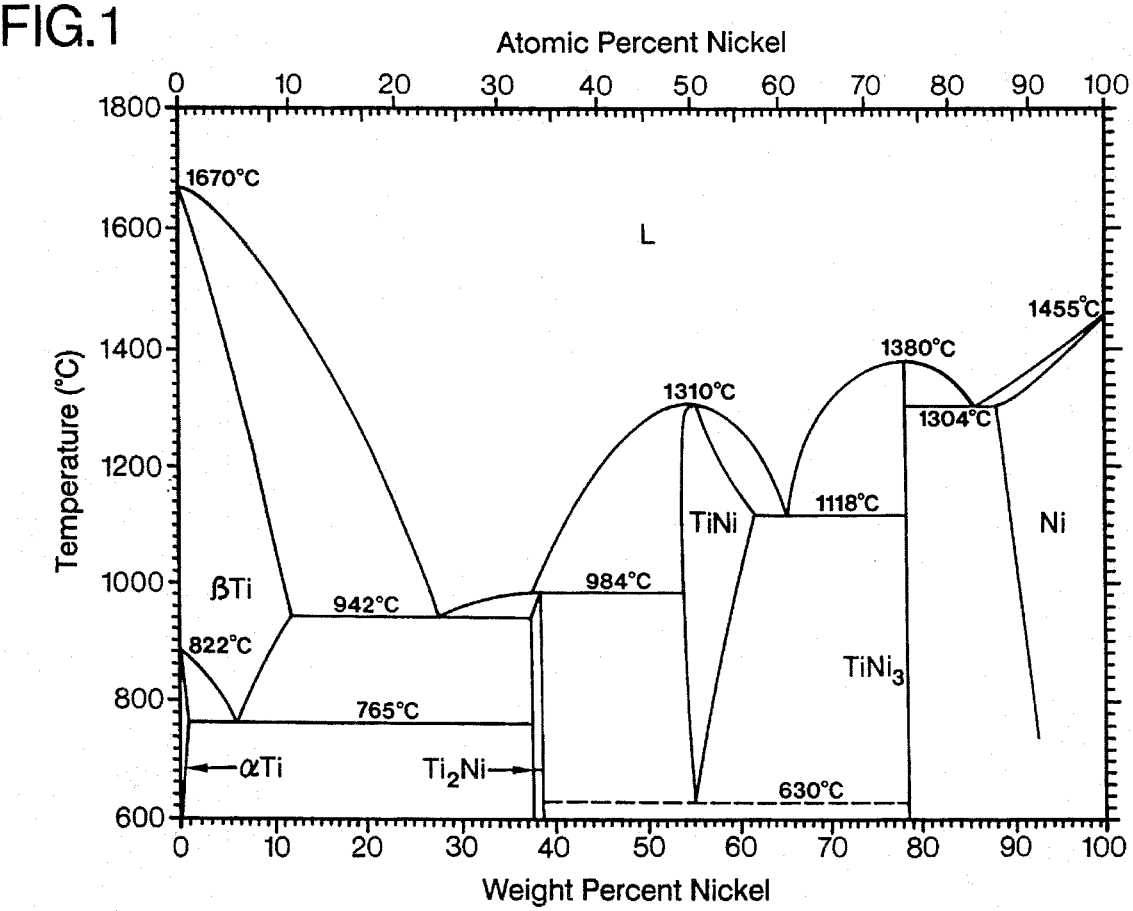
FIG. 1 is a nickel-titanium binary phase diagram based on weight and atomic percent nickel.

NiTi intermetallics suitable for the present invention can be made with varying percentages of nickel and titanium. For instance, the nickel content of the NiTi alloy can range from about 55 weight percent to about 60 weight percent (from about 49.5 atom percent to about 57 atom percent), as shown in the phase diagrams of FIG. 1. Although virtually any NiTi alloy having a composition within the stated weight percent (or atomic range) will suffice for the present invention, two NiTi alloys typically were used. These alloys arbitrarily are designated NiTi-1 and NiTi-2, and can be produced by methods known in the art. The difference between NiTi-1 and NiTi-2 primarily is the different weight percents of Ni. This is shown below in Table 1. However, particularly suitable NiTi alloys useful for this invention were obtained from Shape Memory Applications, Inc., of Sunnyvale, Calif.

The atomic and weight compositions for NiTi-1 and NiTi-2 are shown below in Table 1, as are the $M_s$ temperatures. The $M_s$ temperature is defined as the temperature at which the martensite phase first starts to form as a NiTi alloy is cooled. The $M_s$ temperatures for NiTi-1 and NiTi-2 are about 80° C. and about −25° C., respectively. Hence, at room temperature, NiTi-1 primarily is in the martensitic (product) phase, and NiTi-2 is primarily in the β (parent) phase. Presently, a particularly suitable NiTi alloy is NiTi-2, which includes about 50.7 atom percent nickel and about 49.3 atom percent titanium (55.8 weight percent nickel, 44.2 weight percent titanium).

TABLE 1

| Alloy Designation | Composition | | $M_s$ Temperature |
|---|---|---|---|
| | Weight % | Atomic % | °C. |
| NiTi-1 | 55.1 Ni | 50.0 Ni | 80.0 |
| | 44.9 Ti | 50.0 Ti | |
| NiTi-2 | 55.8 Ni | 50.7 Ni | −25.0 |
| | 44.2 Ti | 49.3 Ti | |

Interestingly, the $M_s$ temperature also is dependent upon the nickel content of the NiTi alloy. Increasing the nickel content causes the $M_s$ value to decrease. Thus, if a particular $M_s$ temperature is particularly suitable for a specific application, then that $M_s$ temperature can be selected by varying the Ni content. For the present invention, the $M_s$ temperature is chosen to be preferably from about 10° C. to about −25° C. Alloys having an $M_s$ within this range are substantially in the β phase, and have a nickel content of from about 55.1 weight percent to about 55.8 weight percent.

Several NiTi alloy specimens of the NiTi-1 and NiTi-2 composition were purchased, each specimen having a different thickness. Table 2 is a list of NiTi-2 sample numbers, the lot numbers from Shape Memory Applications, Inc., and the respective thicknesses for each sample.

TABLE 2

| ALLOY NUMBER | THICKNESS | AVERAGE VICKERS HARDNESS |
|---|---|---|
| LOT 00410-2-2 | .014 in. | 250 |
| LOT 00410-2-2 | .038 in. | 280 |
| LOT 00410 | .015 in. | 265 |
| LOT "BB" | .025 in. | 285 |

II. Annealing the NiTi Alloys

The NiTi strips received from Shape Memory Applications, Inc. were annealed as received to obtain the ordered β phase. One skilled in the art will realize that any combination of conditions that satisfactorily anneal the NiTi alloys is within the scope of this invention. For instance, the NiTi strips may be annealed in a vacuum or an inert atmosphere at a temperature of from about 500° to about 1000° C., more preferably from about 650° to about 750° C. Presently, a particularly suitable method for annealing the NiTi alloys comprises annealing the NiTi strips in an argon atmosphere at about 700° C. The NiTi strips are annealed at or about this temperature for about five to about twenty-five minutes, more preferably from about ten to about twenty minutes, and even more preferably for about fifteen minutes. To maintain the flatness of the strips during the annealing process, the strips were placed between two zirconia substrates. The zirconia substrates were clamped together and the entire assembly then was placed in an argon atmosphere and heated to about 700° C.

Figure 2:
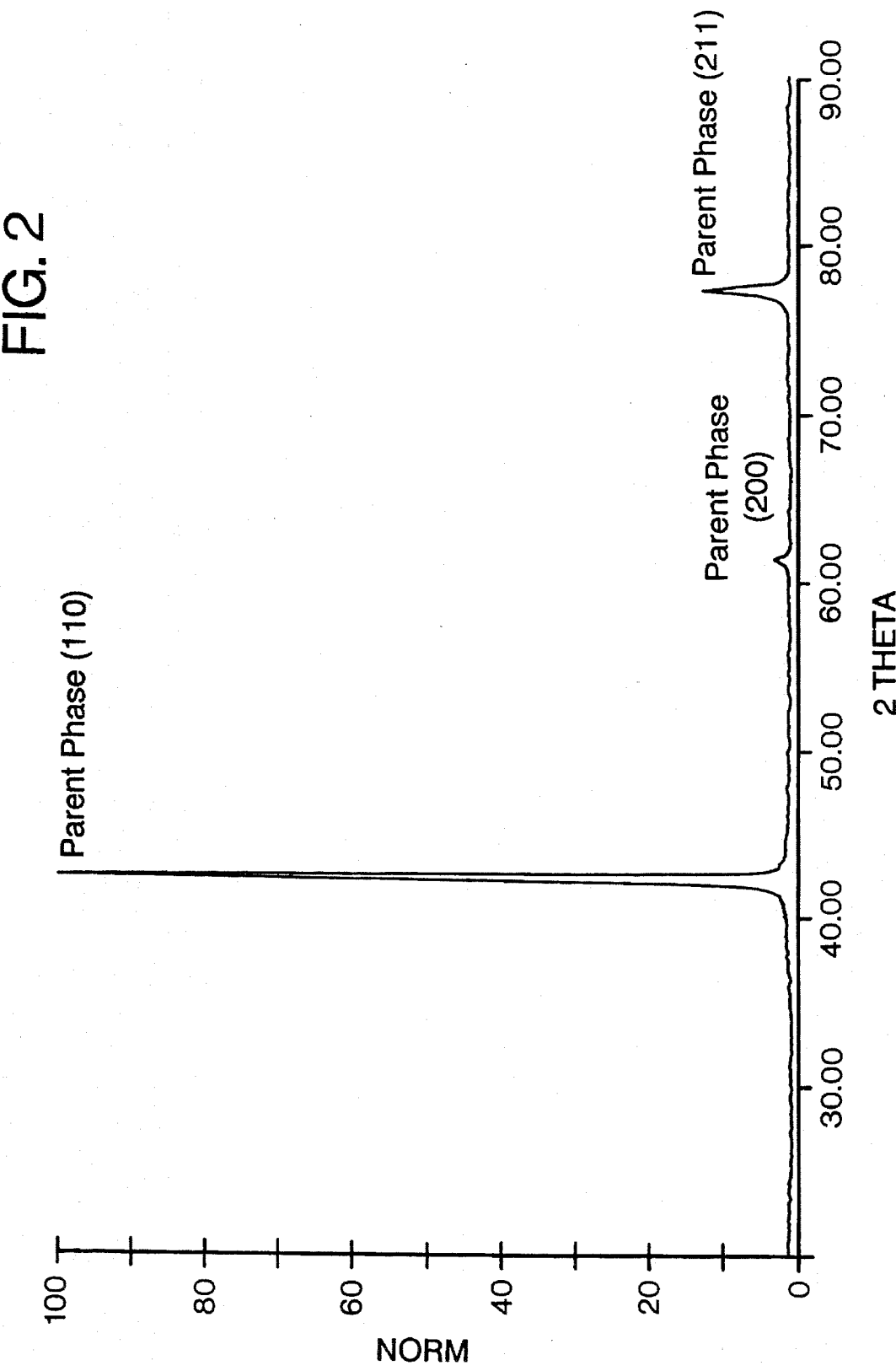
FIG. 2 is an X-ray diffraction pattern of a NiTi alloy annealed according to the process of the present invention.

Small samples were cut from each of the NiTi strips after they were annealed. These strips then were subjected to X-ray diffraction (XRD) analysis using a Phillips PW 1720 X-ray generator and software from Material Data, Inc. X-ray diffraction analysis was used to determine whether the NiTi strips were in the ordered β phase. A typical X-ray diffraction pattern for a NiTi strip annealed according to the present invention is shown in FIG. 2. No martensitic peaks were detected in the sample, and the X-ray diffraction pattern shows that the ordered β phase was achieved by the NiTi alloy during the annealing process.

Vickers microhardness measurements were taken of NiTi samples annealed as described above. These measurements were made with a Leco M-400 hardness tester using a 200 gram load and a hold time of 10.0 seconds. The annealed NiTi strips had average Vickers microhardness values of from about 250 HV to about 285 HV. Average Vickers microhardness values for each NiTi strip, along with its corresponding thickness and alloy number, are shown above in Table 2.

Metallography also was performed on the annealed NiTi strips using a Versamet-2, Unitron Metallograph. The etchant used, referred to as a NiTi etch, consisted of 20 ml hydrofluoric acid, 40 ml sulfuric acid, and 50 ml water. No evidence of a martensitic phase was seen in micrographs taken of the NiTi alloys. The average grain size for the alloys tested according to the present invention was from about 20 μm to about 25 μm as determined by the Circular Intercept and Planimetric method as described in ASTM standard E-112-85.

III. Cavitation Erosion Tests on Annealed NiTi Samples

NiTi alloys annealed as discussed above were subjected to cavitation erosion conditions. More particularly, two NiTi alloys having a 1 mm thickness were annealed at 700° C. for about ten to about fifteen minutes. The grain size for the martensitic material was about 12 μm to about 14 μm, and from about 16 μm to about 18 μm in the sample having the ordered β phase. Specimens of about 29 μm×32 mm were cut from the annealed strips and then progressively polished using a 1 μm diamond grit. The annealed NiTi specimens were firmly secured in a specimen holder and immersed in about 25 liters of distilled water, maintained at a temperature of about 22° C., up to a depth of about 25.4 mm. The NiTi samples then were exposed to cavitation using a cavitation-inducing device produced by Branson Sonic Power. This device produces longitudinal oscillations of about 20 kHz, wherein the oscillations have an amplitude of about ±25 μm. The separation between the oscillating tip of the device and the stationary sample was about 0.5 mm.

At regular intervals, the samples were removed from the sample holder to determine what, if any, material loss had occurred during cavitation. Material loss was determined by periodically drying and weighing the samples to determine the change in mass. Previous studies with materials other than NiTi alloys, such as low carbon and stainless steel, indicated that material loss in vibratory cavitation typically occurs in about twelve hours or less. The cavitation exposure time for the NiTi samples had to be extended up to about thirty-eight hours to detect mass loss.

Figure 3:
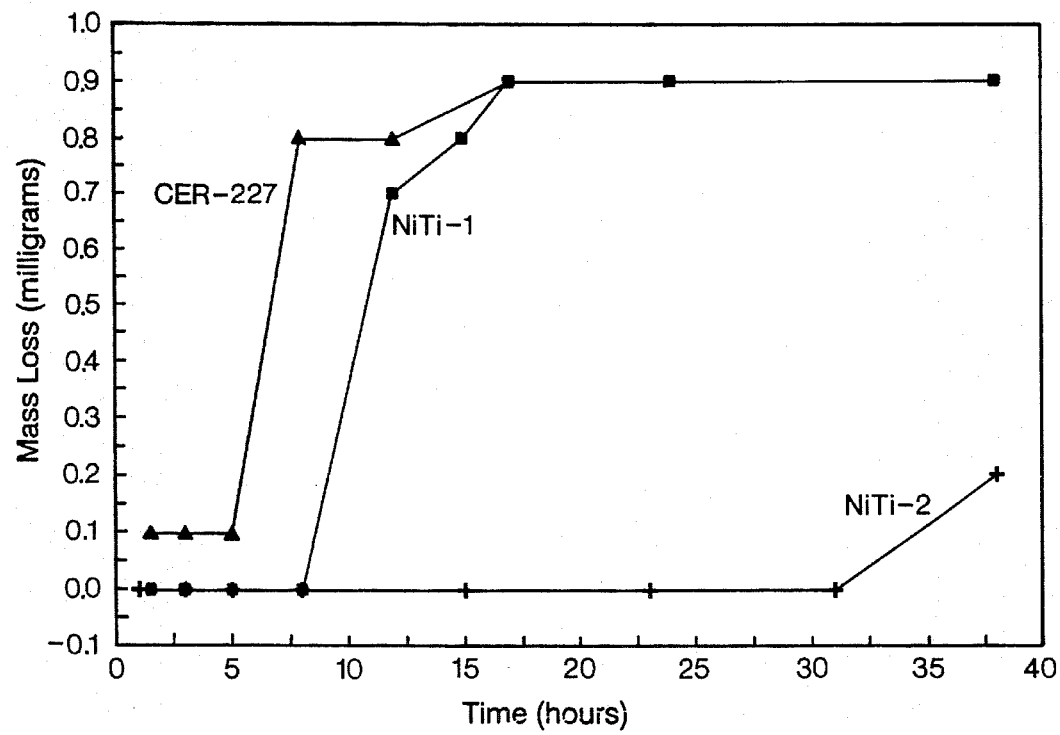
FIG. 3 is a graph showing mass loss in milligrams as a result of cavitation erosion for CER 227 and two NiTi specimens made according to the present invention.

The results of these cavitation erosion tests are summarized in FIG. 3, which shows the results for NiTi cavitation experiments relative to Certanium 227 (CER-227). CER-227 is a weld-deposited overlay that has a composition, by weight percent, of about 60.5%-Co, 27%-Cr, 4.4%-Mo, 3.5%-Ni, and 2.7%-Fe. FIG. 3 expresses cavitation erosion as the amount of material lost, in milligrams, per unit time. FIG. 3 shows that NiTi-1 is better, up to about fifteen hours, for resisting cavitation erosion relative to CER-227. After about fifteen hours, the cavitation erosion resistance of NiTi-1 is virtually the same as CER-227. However, NiTi-2 is surprisingly superior to CER-227 in cavitation erosion. Hence, a presently preferred NiTi alloy for resisting cavitation erosion is NiTi-2, although NiTi-1 also is superior to presently available materials.

Without limitation, one proposed reason for the large difference between the cavitation erosion rates of NiTi-1 and NiTi-2 is the different modes of deformation that each type of NiTi exhibits. NiTi-1 has an $M_s$ temperature of about 80° C. Cavitation erosion tests typically were done at or about room temperature, or about 22° C. Thus, the $M_s$ temperature was significantly higher than the ambient temperature, and the NiTi-1 test sample therefore primarily was in the martensitic state. This alloy apparently deforms primarily by twin-boundary motion when exposed to cavitation erosion. The NiTi-2 alloy has an $M_s$ temperature of about −25° C., which is significantly below the ambient test temperature. Thus, the NiTi-2 alloy primarily was in the β phase at room temperature. Apparently, the β phase deforms by the formation and reversion of stress-induced martensite, which is believed to impart surprisingly superior cavitation erosion resistance to the NiTi-2 alloy.

Figure 4:
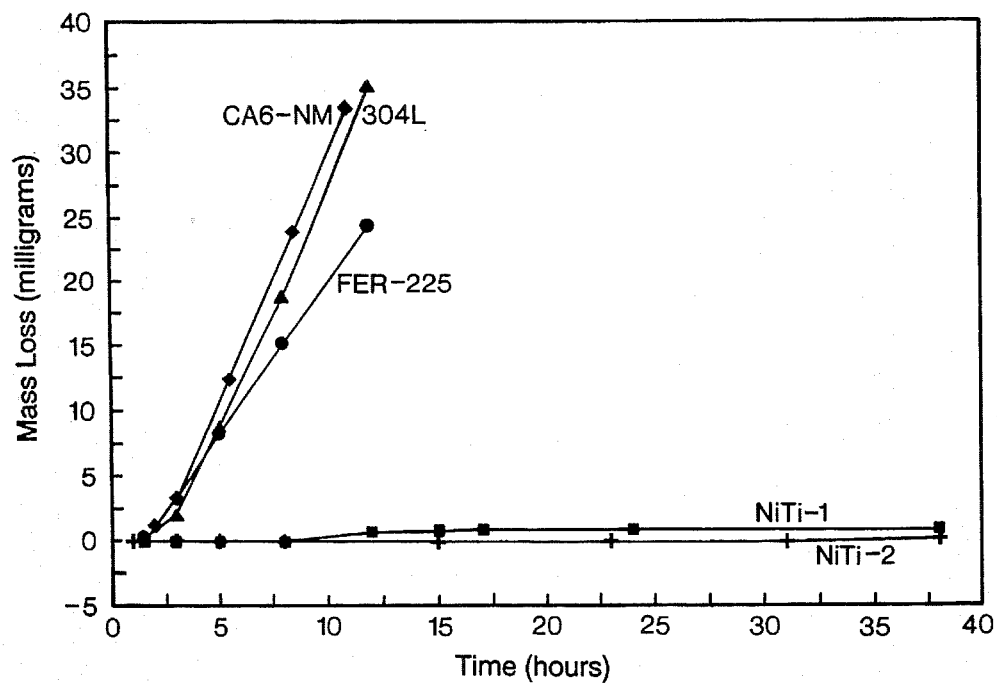
FIG. 4 is a graph showing the mass loss in milligrams as a result of cavitation erosion for two NiTi samples made according to the present invention and conventional materials used for producing hydraulic machinery.

NiTi alloys according to the present invention also were tested against four materials commonly used to make erosion-resistant hydraulic machines. The four alloys tested were: 304L, a stainless steel containing 18.6%-Cr and 8.4%-Ni; FER-225, a duplex stainless steel having a weight-percent composition of about 70.0%-Fe, 25.0%-Cr, and 5%-Ni; CA6-NM, a cast, martensitic steel having a weight-percent composition of about 83.0%-Fe, 13.0-Cr, and 4.0%-Ni; and CER-227. The data obtained from these tests are summarized in FIG. 4. As with FIG. 3, FIG. 4 measures the cavitation erosion rate in terms of mass loss per unit time. FIG. 4 shows that NiTi samples according to the present invention are superior to other commonly used materials in resisting cavitation erosion. More specifically, the cavitation erosion rate at twelve and a half hours for FER-225, the next-best erosion-resistant material, is about 2.0 mgs/hour. The cavitation erosion rate for NiTi-1 at twelve and a half hours is about 0.08 mgs/hour, and substantially 0.0 mgs/hour for NiTi-2. Hence, NiTi alloys according to the present invention are at least about 25 times as resistant to cavitation erosion as the next-best material tested.

Based on the data presented above, both NiTi-1 and NiTi-2 are surprisingly resistant to cavitation erosion. However, making hydraulic machinery entirely out of NiTi would be prohibitively expensive. For instance, NiTi alloys cost from about $300/pound to about $400/pound, which is at least about an order of magnitude more expensive than commonly used materials. Furthermore, some of the cavitation erosion resistance exhibited by NiTi may be lost when NiTi samples having thicknesses required to form hydraulic machines are used. Hence, the present invention provides a method for plating at least a portion of the surface area of a metal, such as steel or titanium, workpiece with NiTi alloys, particularly the NiTi-2 alloy. The surface area to be covered with a NiTi alloy primarily is that portion of the workpiece that potentially is exposed to LDE and cavitation erosion.

IV. Explosive Welding

A method has been developed for explosively welding NiTi alloys, particularly NiTi-2 type alloys having about 55.8 weight-percent nickel, to a metal, such as a steel, workpiece. NiTi alloys having thicknesses of from about 0.01 inch to about 1.0 inch may be explosively bonded to a metal substrate according to the method. The mechanism of explosive welding is not completely understood or agreed upon at the current time. However, it is generally agreed that a metallic jet must be formed at the collision point of the two plates. The metallic jet is formed by the surface layers of the two metal plates and produces two substantially clean metal-plate surfaces. The metallic jet therefore permits intimate contact to occur between the two metal-plate surfaces.

Figure 5A:
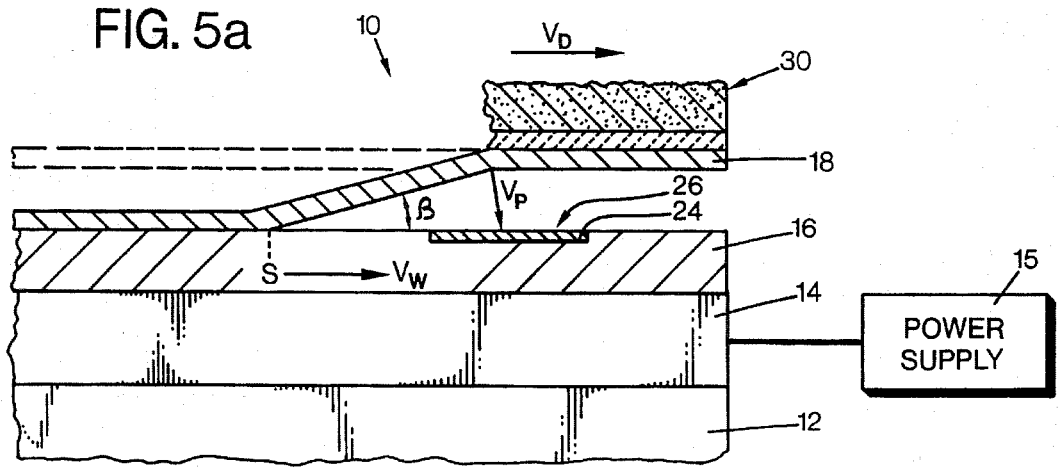
FIG. 5a is a schematic showing the main components and parameters for explosive welding.
Figure 5B:
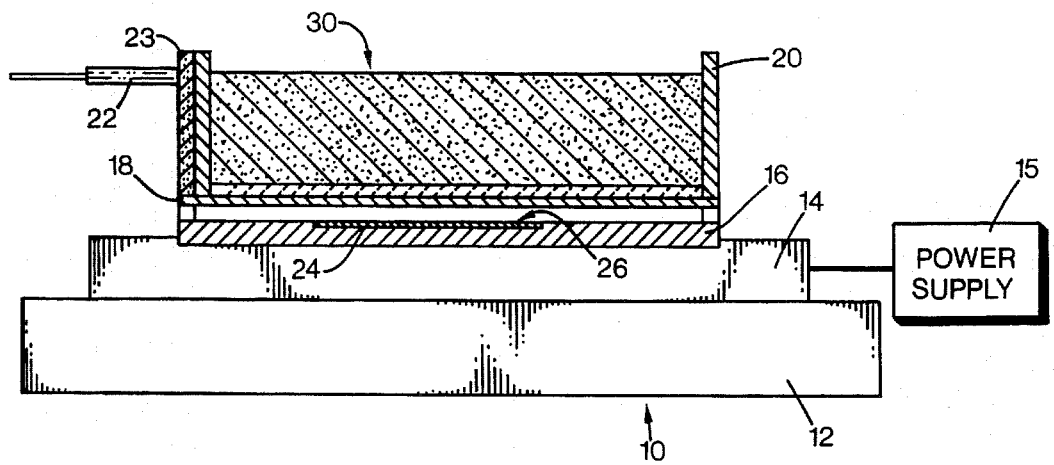
FIG. 5b is a cross-sectional schematic side view of a parallel explosive welding assembly useful for the present invention.

Two basic arrangements can be used for explosive welding, a parallel arrangement or an inclined arrangement. The inclined arrangement generally is used with explosives having a detonation velocity greater than about the sonic velocity of the metals being welded. Presently, a parallel arrangement, shown in FIG. 5b, is a preferred method for explosively bonding NiTi alloys to steel workpieces.

Several parameters typically are considered when discussing explosive welding. These parameters are shown schematically in FIG. 5a. FIG. 5a shows a flyer plate 18 being accelerated towards a base plate 16 using an explosive 30. As shown in FIG. 5a, the detonation of explosive 30 occurred from left to right. Thus, FIG. 5a shows flyer plate 18 having only partially completed its acceleration towards NiTi sample 26.

As shown in FIG. 5a, the independent explosive-welding parameters are: stand-off distance, which is the distance between flyer plate 18 and base plate 16; initial angle of inclination (α) (α=0 for parallel arrangement); explosive detonation velocity ($V_d$); and flyer-plate impact velocity ($V_p$). The dependent parameters are: collision angle (β); welding velocity ($V_w$); and flyer-plate velocity ($V_f$), relative to the collision point (S).

The following parameters must be achieved for explosive welding to occur.

1. A minimum collision angle β must be exceeded to cause jetting.
2. A detonation velocity $V_d$ must be used that is less than the sonic velocity of the metals being welded, if a parallel arrangement is used.
3. A minimum value of impact pressure, which is related to $V_p$, must be achieved to produce fluid-like behavior of the metals at the collision point S.
4. A sufficient stand-off distance, d, must be used to allow the flyer plate to accelerate to the required impact velocity, $V_p$.

One explosive welding assembly useful for welding small samples to a metal workpiece, such as steel, is shown in FIG. 5b. FIG. 5b shows explosive assembly 10 comprising an anvil 12, an electric heater 14, a power supply 15, a base plate 16, a steel flyer plate 18, an explosive frame 20, and a detonator 22. The purpose of the anvil 12 is to provide a solid surface upon which to conduct the explosive bonding. One skilled in the art will realize that any anvil 12 suitable for this purpose is within the scope of the present invention. However, a particularly suitable anvil presently comprises an aluminum block having dimensions of about 4 inches by 1 foot by 1 foot.

The welding assembly also includes heating means for heating the NiTi sample 26, such as an electric heater 14. One skilled in the art will realize that any means for heating the sample can be employed. However, a particularly suitable method for heating the NiTi sample comprises heating the NiTi sample using a resistance heater. A particularly suitable resistance heater comprises a ceramic-fiber insulator that includes nichrome-wire inserts. The ceramic fiber was purchased from the Refractory Products Co. of Elgin, Ill., and was then fitted with nichrome wire, which acts as a resistance heater. An amount of the ceramic fiber was used to provide a structure having slightly greater dimensions than the base plate. The heater was powered by a 120 V, 15 A Variac power source. Typically, the Variac was calibrated by measuring the time required to heat a NiTi sample to about 300° C. Samples were thereafter heated for the measured time period.

The purpose of heating the NiTi alloy is to increase its ductility before explosively welding the alloy to a metal workpiece. The ductility of the NiTi alloy should preferably be increased in order for it to weld properly, i.e. in order for the weld to be substantially free of defects. The maximum amount of increased ductility that can be achieved by the NiTi alloys and still be within the scope of this invention is determined primarily by considering the increased reactivity, primarily oxidation, of the NiTi alloy at increased temperatures. As the heating temperature increases or the heating time increases, the NiTi sample is more likely to undergo oxidation. Hence, although there is no upper limit to increasing the ductility per se, the upper temperature range and heating time is limited by considering the quality of the end product.

A suitable temperature range for this heating step has been found to be from about 200° C. to about 400° C., more preferably from about 250° C. to about 350° C. A presently preferred temperature for heating the NiTi alloys is about 300° C. A particularly suitable heating time at a heating temperature of about 300° C. is from about ten minutes to about twenty-five minutes, more preferably from about ten minutes to about twenty minutes. Presently, a preferred heating period at a temperature of about 300° C. is about fifteen minutes. Heating the NiTi sample to a temperature of from about 250° C. to about 350° C., preferably about 300° C., increases the ductility and also reduces the likelihood that shear cracks will form in the NiTi during welding. One skilled in the art will realize that this temperature can vary and still be within the scope of the present invention.

Base plate 16 typically comprises a metal plate, such as a steel or stainless-steel plate. Presently, a particularly suitable base plate comprises ¼ inch AISI-SAE thick 1040 steel. Base plate 16 may have machined therein a region, such as pocket 24, for receiving the NiTi sample.

For the present invention, the NiTi sample 26 was used as the backer plate, and a low-carbon steel (LCS) was used as a flyer plate 18. The flyer plate 18 comprises a hot-rolled steel plate having about 0.2% carbon. The steel flyer plate was approximately a 6-inch square plate having a thickness of about 0.140 inch (ASTM A569 steel). NiTi was used as the backer plate because of its small size, and because of the ease of heating NiTi. One skilled in the art will realize that using the NiTi alloy as the flyer plate may change as the particular application changes. For instance, if a large industrial machine is to be clad with NiTi alloys according to the present invention, then the NiTi alloy probably would be used as the flyer plate rather than accelerating the hydraulic machine towards a NiTi backer plate.

Pocket 24 contains the NiTi sample 26 and helps maintain the welded NiTi/LCS composite flat during the welding process. Pocket 24 also provides a momentum trap to capture reflected shock waves that may have magnitudes sufficient to tear apart the weld at the welded interface if the shock wave is allowed to re-enter the welded tandem.

FIG. 5b shows that the assembly 10 includes an explosive frame 20. Frame 20 provides a means for positioning an explosive 30 adjacent to the flyer plate 18. Explosive frame 20 typically comprises a box-like structure that does not have either a top or a bottom. The explosive frame 20 may be made of any suitable material, such as a metal or wood. A suitable frame for the present invention presently comprises an open-faced wooden box. The height of the box, referred to herein as frame height, provides a method for determining the amount of explosive to use. The explosive 30 is placed inside the box and on top of the flyer plate 18 so that the explosive has a certain height as measured relative to the flyer plate and along the walls of the box.

Assembly 10 also includes a detonator 22. One skilled in the art will realize that any detonator typically used for explosive bonding is within the scope of this invention. However, a particularly suitable detonator for the invention presently is a NONEL (nonelectric) detonator. This detonator can be purchased from a number of sources, including the Ensign-Blockford Company of Connecticut.

As shown in FIG. 5b, the detonator is attached to a booster 23. Booster 23 is an explosive that is used to initiate the explosion of explosive 30. Presently, a particularly suitable booster is available from the Dupont Chemical Co. and is sold as DETASHEET. A particularly suitable DETASHEET explosive is referred to as C4 DETASHEET. The booster 23 is typically secured to the wall of the frame using any suitable means such as an adhesive. The amount of booster 23 that is used is not critical, and typically is determined by using a piece that is about the same size as the height of the explosive frame 20.

Figure 6:
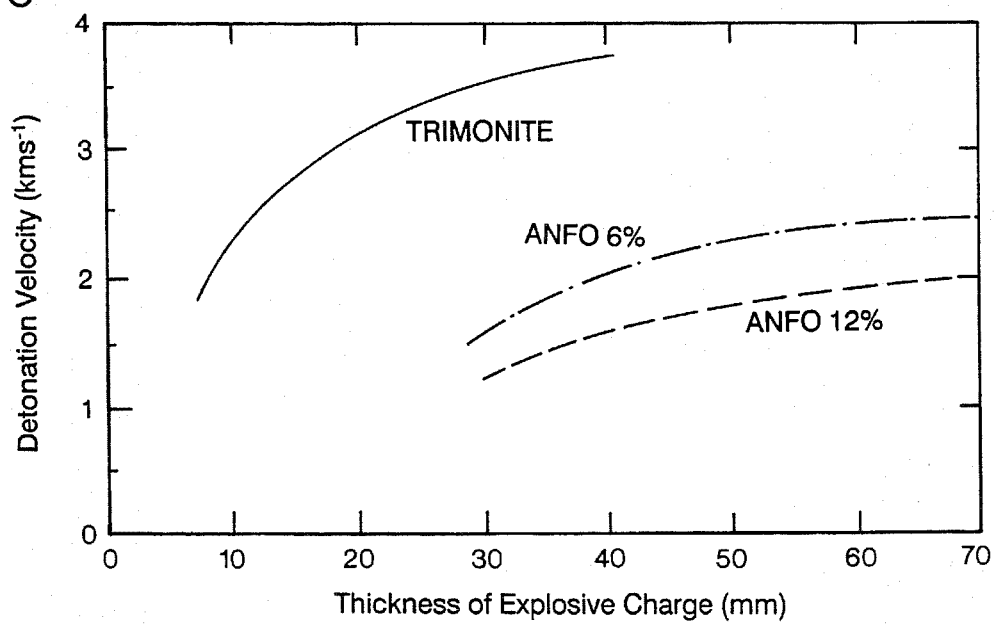
FIG. 6 is a plot of the detonation velocity of an ammonium nitrate fuel oil (ANFO) explosive suitable for the present invention versus the thickness of the explosive charge.

The three explosive parameters that appear to determine the conditions at the collision point are flyer-plate impact velocity, welding velocity and collision angle. For the parallel welding arrangement, the welding velocity is equal to the detonation velocity of the explosive. The detonation velocity is easily determined by performing velocity tests on the explosive being used, or by estimating the velocity. FIG. 6 provides a means for determining both the detonation velocity and the welding velocity. FIG. 6 is a graph of the detonation velocity versus the thickness of the explosive charge used.

One skilled in the art will realize that any explosive 30 commonly used for explosive welding is within the scope of the present invention. For instance, any granular or powder explosive can be used, if the explosive can be mixed with a non-reactive material, such as a salt, to have a detonation velocity between about 1,700 meters per second to 2,400 meters per second. One example of an explosive 30 suitable for the present invention is AMATOL. AMATOL is an 80% mixture of ammonium nitrate and 20% TNT. A presently preferred explosive 30 is a commercially available explosive used in the mining industry comprising a mixture of ammonium nitrate and fuel oil (ANFO). The ANFO used for explosively welding a NiTi strip to an LCS substrate according to the present invention was a commercially produced explosive containing 6% grade 2 diesel fuel oil and ammonium nitrate. FIG. 6 shows the detonation velocities of 6% ANFO relative to the thickness, in millimeters, of the explosive charge. Thus, FIG. 6 can be used to determine the detonation velocity of the ANFO explosive that was used as the preferred explosive for this invention.

One skilled in the art will realize that the amount of explosive 30 used to weld the NiTi alloy to a metal workpiece will vary. An amount of ANFO explosive 30 suitable for the present invention may range from about 3 pounds (1.35 kg) to about 5 pounds (2.25 kg) per square foot of NiTi alloy clad. However, the explosive 30 typically is not weighed prior to being used to weld NiTi alloys to steel workpieces. The amount of explosive 30 used for the present invention is determined by measuring the thickness of the explosive once it is placed on top of the flyer plate 18. Presently, a particularly suitable amount of ANFO explosive 30 in a 6 inch by 6 inch square explosive frame 20 is from about 1.5 inches (38.1 mm) to about 1.75 inches (44.5 mm). A presently preferred amount of ANFO explosive 30 is about 1.75 inches (44.5 mm).

FIG. 5b also shows that the flyer plate 18 is not in contact with either the base plate 16 or NiTi sample 26. Rather, the flyer plate 18 is elevated slightly off of base plate 16 by a distance referred to as the stand-off distance. The stand-off distance is achieved by placing a small amount of ceramic felt between the flyer plate 18 and the base plate 16. The ceramic felt does not interfere with the welding procedure, and is removed from between the plates by the metallic jet.

One skilled in the art of explosive welding will realize that the stand-off distance may vary and still be within the scope of the present invention. However, a suitable stand-off distance range has been found to be from about 0.10 inch (2.5 mm) to about 0.20 inch (5.1 mm) for welding a 0.140 inch thick steel flyer plate to a NiTi backer. An even more suitable stand-of distance has been found to be from about 0.11 inch (2.8 mm) to about 0.15 inch (3.8 mm), more preferably from about 0.125 inch (3.18 mm) to about 0.15 inch (3.8 mm). Presently, a particularly suitable stand-off distance has been found to be about 0.125 inch (3.8 mm).

Figure 7:
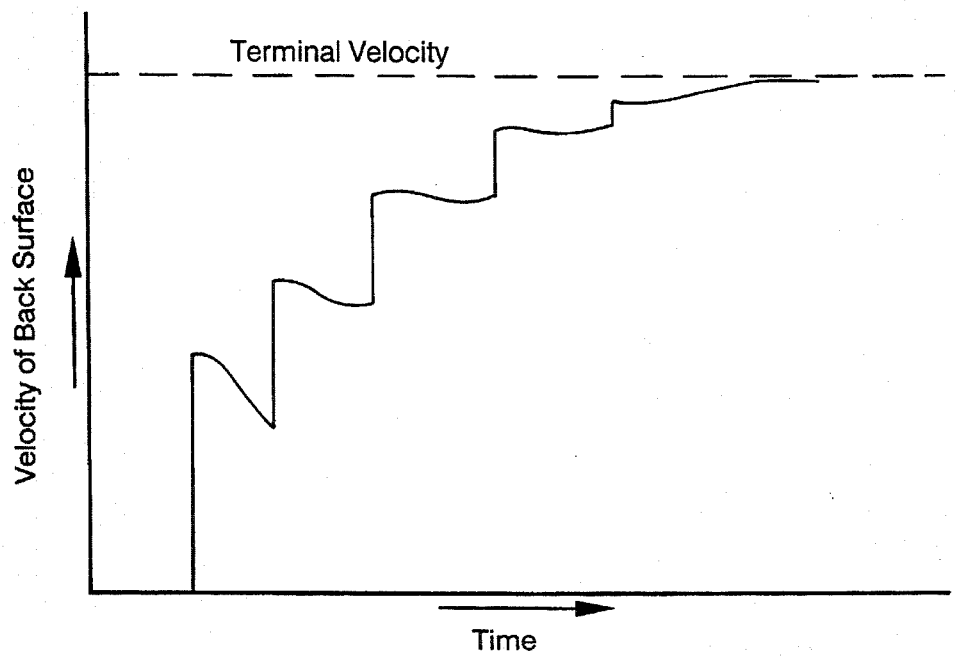
FIG. 7 is a plot of the velocity imparted to a flyer plate by an explosive charge.

Determining the flyer-plate impact velocity is quite difficult. The flyer plate is accelerated over the stand-off distance, as shown in FIGS. 5a and 5b, before it impacts the base plate. The stand-off distance typically is less then the distance required for the flyer plate to reach terminal velocity. Hence, the flyer-plate velocity typically is less than the terminal velocity and must be estimated. FIG. 7 is a plot of the flyer-impact velocity versus the explosive-to-metal-plate-weight ratio for three different explosives. The plot is generated experimentally, and thus provides a means for estimating the flyer-plate impact velocity.

The collision angle can be determined, if the welding velocity and the flyer-plate impact velocity are known, using the formula:

$$V_p/V_d = 2 \sin \beta/2$$

Thus, a person may vary $V_p$, $V_d$ and $\beta$, to determine the best parameters useful for welding the NiTi alloy to a particular metal workpiece.

To explosively weld a plate or strip of NiTi to a metal, such as an LCS plate, assembly 10 typically was equipped with about 1 pound (0.45 kg) to about 2 pounds (0.91 kg) of 6% ANFO. The NONEL detonator 22 was discharged to initiate the explosion of booster 23, and the subsequent explosion of explosive 30. Explosive 30 accelerates steel flyer plate 18 towards the NiTi sample 26. A number of welding tests have been performed to determine what parameters produced a high-strength NiTi/LCS welded composite with an absence of defects, such as shear cracking and interface melting. The data obtained from these explosive bonding tests is presented below in Table 3 and discussed in more detail in the following Examples. The Example numbers in Table 3 correspond to the Example numbers listed in Section V below. The following parameters presently are the best for producing a suitably welded NiTi/LCS composite: frame height=1.75 inches (44.5 mm); stand-off distance= 0.125 inch (3.18 mm); detonation velocity=2,200 m/sec; welding velocity=440 km/sec; and collision angle=11.5 degrees.

TABLE 3

| EXAMPLE # | FRAME HEIGHT inches (cm) | STAND-OFF inches (cm) | *DETONATION (V$_p$) μm/sec | **WELDING VELOCITY (V$_p$) μm/sec | ***COLLISION ANGLE (β) |
|---|---|---|---|---|---|
| 1 | 2.0 (5.0) | .200 (.51) | 2300 | 450 | 11.2 |
| 2 | 1.5 (3.8) | .150 (.38) | 2000 | 385 | 11.0 |
| 3 | 1.0 (2.5) | .125 (.32) | 1300 | 305 | 13.5 |
| 4 | 1.0 (2.5) | .125 (.32) | 1300 | 305 | 13.5 |
| 5 | 1.5 (3.8) | .150 (.38) | 2000 | 385 | 11.0 |
| 6 | 1.5 | .150 | 2000 | 385 | 11.0 |

TABLE 3-continued

| EXAMPLE # | FRAME HEIGHT inches (cm) | STAND-OFF inches (cm) | *DETONA-TION ($V_p$) µm/sec | **WELDING VELOCITY ($V_p$) µm/sec | ***COLLISION ANGLE ($\beta$) |
|---|---|---|---|---|---|
|  | (3.8) | (.38) |  |  |  |
| 7 | 1.5 | .150 | 2000 | 385 | 11.0 |
|  | (3.8) | (.38) |  |  |  |
| 8 | 1.75 | .125 | 2200 | 440 | 11.5 |
|  | (4.5) | (.32) |  |  |  |

*Determined from FIG. 6
**Determined from FIG. 7
***Calculated from $V_p/V_d = 2\sin(\beta/2)$

V. Formation of NiTi-Metal Composites

The following examples describe the formation of NiTi-metal composites by explosively bonding NiTi alloys to steel base structures, such as a low-carbon steel (LCS) workpiece.

EXAMPLE 1

The explosive welding assembly 10 (assembly) described above was used for this example. Two NiTi alloy samples were placed in the machined depression 24 in the assembly 10. The first alloy sample had a thickness of about 0.014 inch (0.36 mm), and the second NiTi alloy sample had a thickness of about 0.038 inch 0.97 mm). The explosive bonding parameters for this example (as shown in Table 3) were as follows: the frame height was about 2.0 inches (50.8 mm); the stand-off distance was about 0.200 inch (5.1 mm); the detonation velocity was about 2300 m/sec; the welding velocity was about 450 m/sec; and the collision angle was about 11.2 degrees. The detonation velocity of the ANFO explosive was determined by reference to FIG. 6.

Figure 8:
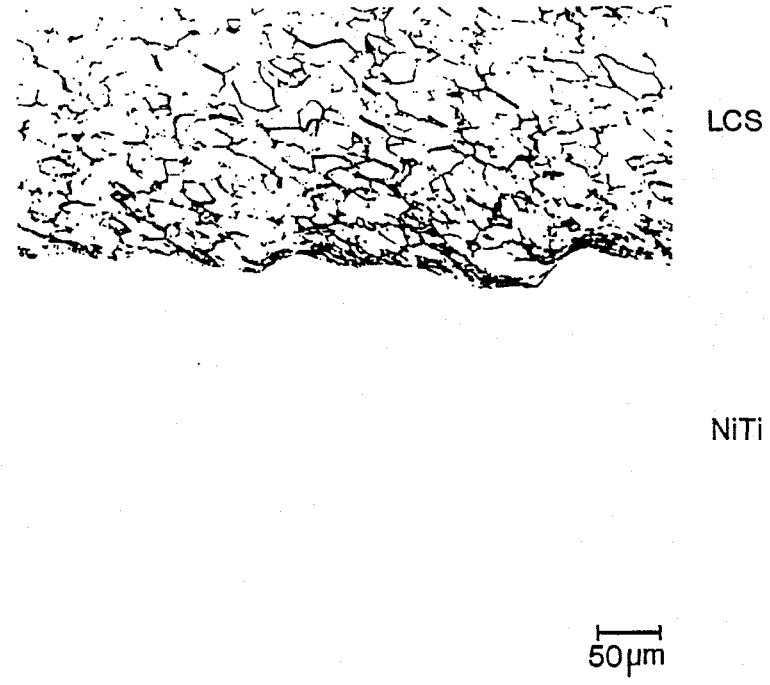
FIG. 8 is an optical micrograph of a NiTi alloy bonded to a metal substrate according to the method of the present invention.

Both the first and second NiTi alloys used in this Example 1 welded to the steel substrate. However, the 0.014 inch (0.36 mm) NiTi alloy welded to both the flyer plate 18 and the base plate 16. Large shear cracks also were apparent in this NiTi alloy, presumably as a result of large waves that are produced during the bonding process. FIG. 8 is an optical micrograph of the interface between the NiTi alloy and the steel substrate produced according to this example. FIG. 8 shows that the bond morphology at the interface is wavy, and clearly shows that the NiTi alloy and the substrate are bonded to each other.

A wavy interface also was produced for the NiTi alloy having a thickness of about 0.038 inch (0.95 mm). Although this NiTi alloy also exhibited shear cracks, the bond appeared quite strong. X-ray diffraction analysis was performed on the 0.038 inch (0.95 mm) NiTi alloy after it was explosively bonded to the steel workpiece. The NiTi alloy did not undergo a phase transition during the bonding process, and hence the ordered β-phase structure was retained.

The microhardness value for the NiTi alloy increased as a result of explosively bonding it to the steel workpiece. After explosive bonding, the NiTi alloy had a Vickers microhardness of about 305 HV throughout the thickness of the NiTi alloy, whereas the annealed NiTi alloy had an average Vickers microhardness of about 271 HV. Thus, the explosive welding process could have a deleterious effect on the mechanical properties of the NiTi alloy. Hence, devices plated with the NiTi alloys of the present invention may require post-weld treatment, as discussed in more detail below, to restore their unique resistance to cavitation erosion.

EXAMPLE 2

Figure 9:
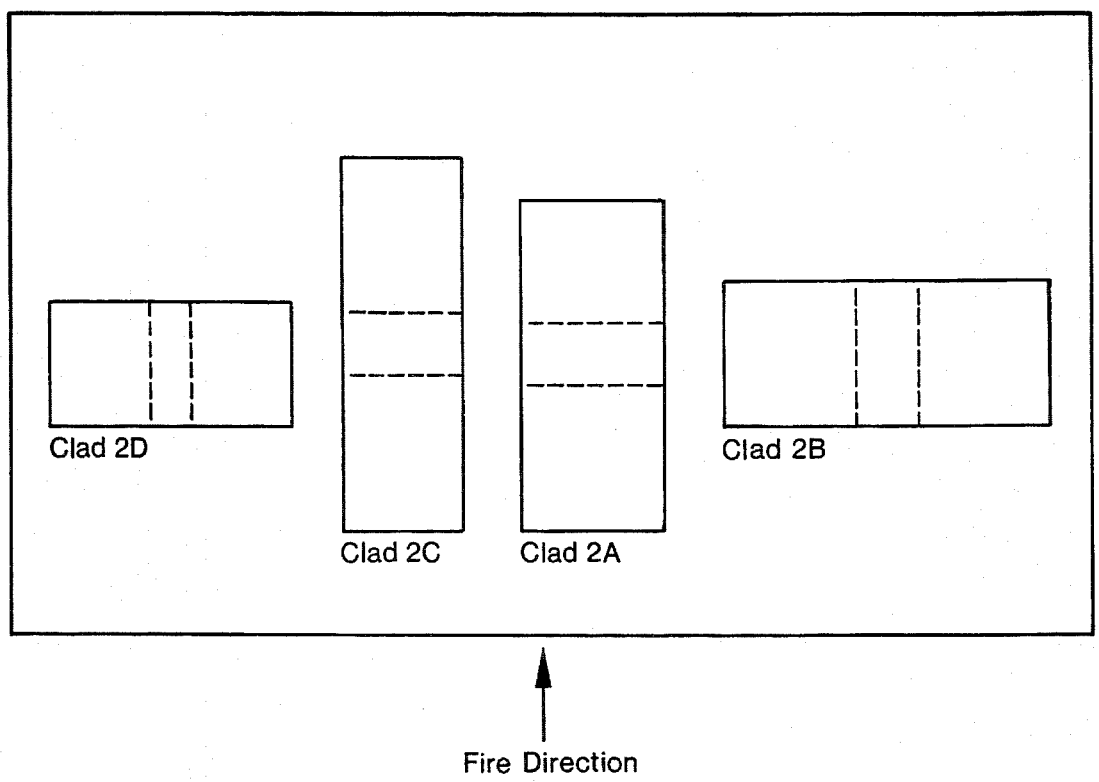
FIG. 9 is a schematic drawing showing the arrangement of NiTi samples relative to a steel base plate for explosive bonding according to the present invention.
Figure 14:
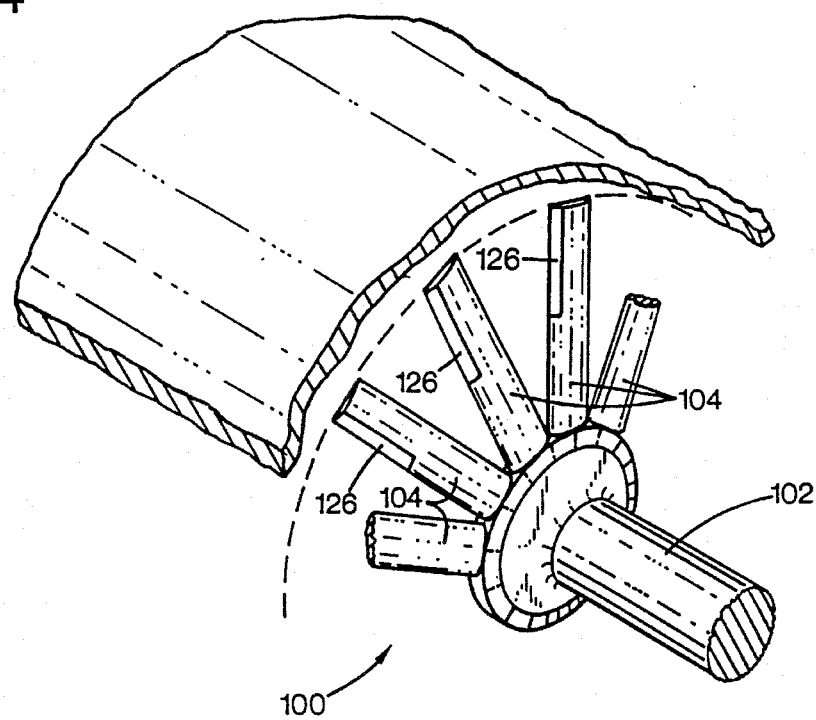
FIG. 14 is schematic drawing of a turbine blade plated according to the present invention with a NiTi alloy.

The purpose of this Example is to determine if the rolling direction of the NiTi alloy had any effect on explosively welding NiTi alloys to an LCS workpiece. The samples were arranged so that the bonding direction would be parallel to the rolling direction of the NiTi for one set of samples, and perpendicular to the rolling direction for a second set of samples. Two thicknesses of NiTi alloy again were used, the first had a thickness of about 0.015 inch (0.38 mm), and the second had a thickness of about 0.038 inch (0.89 mm). FIG. 9 shows the arrangement of the NiTi samples in the steel base plate. Micrographs were taken of each sample after it had undergone explosive welding. In each sample, the NiTi alloy welded to both the LCS flyer plate and the steel base plate. Moreover, cracking was observed in the NiTi alloys having thicknesses of about 0.015 inch (0.38 mm), whereas no shear cracking was seen in the 0.038 inch (0.89 mm) NiTi alloys.

The results of this Example 2 indicate that the rolling direction of the NiTi alloy does not significantly affect the bond-zone morphology. However, ductility may be better parallel to the rolling direction than perpendicular to the rolling direction.

EXAMPLE 3

In this example, the bonding parameters were changed to avoid bonding the NiTi alloy to the base plate. The NiTi alloy had a thickness of 0.025 inch (0.64 mm). The bonding parameters for this explosive welding test worked quite well and are as follows: frame height=about 1.50 inches (38.1 mm); stand-off distance=about 0.150 inch (3.81 mm); detonation velocity=about 2,000.0 m/sec; welding velocity= about 385.0 m/sec; and collision angle=about 11.0 degrees.

Figure 10A:
FIG. 10a is an optical micrograph of a 0.025 inch NiTi alloy explosively bonded to a low-carbon steel (LCS) substrate according to the method of the present invention.
Figure 10B:
FIG. 10b is an optical micrograph of a 0.025 inch NiTi alloy explosively bonded to an LCS substrate according to the method of the present invention.

The initial dimensions of the NiTi alloy sample were 2.5 inches (63.5 mm) by 2.75 inches (69.9 mm). The edges of the NiTi alloy did not bond, and hence the dimensions of the bonded sample were about 2 inches (51 mm) by about 2.125 inches (54 mm). This is common with explosive bonding and is referred to as the "edge effect." Based on the optical micrographs of FIGS. 10a and 10b, the bond morphology for the NiTi welded samples of this Example 3 is substantially flat. X-ray analysis indicated that no phase transition had occurred during the bonding process. The Vickers microhardness for the welded NiTi alloy was about 340 HV, whereas the annealed NiTi alloy had a Vickers microhardness of about 285 HV.

EXAMPLE 4

Figure 11A:
FIG. 11a is an optical micrograph of a 0.025 inch NiTi alloy explosively bonded to an LCS substrate according to the method of the present invention.
Figure 11B:
FIG. 11b is an optical micrograph of a 0.025 inch NiTi alloy explosively bonded to an LCS substrate according to the method of the present invention.

The explosive bonding parameters for this Example 4 are the same as the bonding parameters for Example 3, although the distance from the NiTi sample to the explosive initiation point was increased to simulate a longer "length-of-run" bonding. A flat interface was produced between the NiTi alloy and the LCS workpiece. X-ray diffraction analysis again indicated that no phase transition had occurred and that the ordered BCC (B2) structure had been retained. The NiTi alloy welded to the LCS workpiece had an average Vickers microhardness of about 341 HV, whereas the annealed NiTi alloy had an average vickers microhardness of about 285 HV. Based on the optical micrographs of FIGS. 11a and 11b, the bond morphology for the NiTi welded samples of this Example 4 is substantially flat.

EXAMPLE 5

Figure 12A:
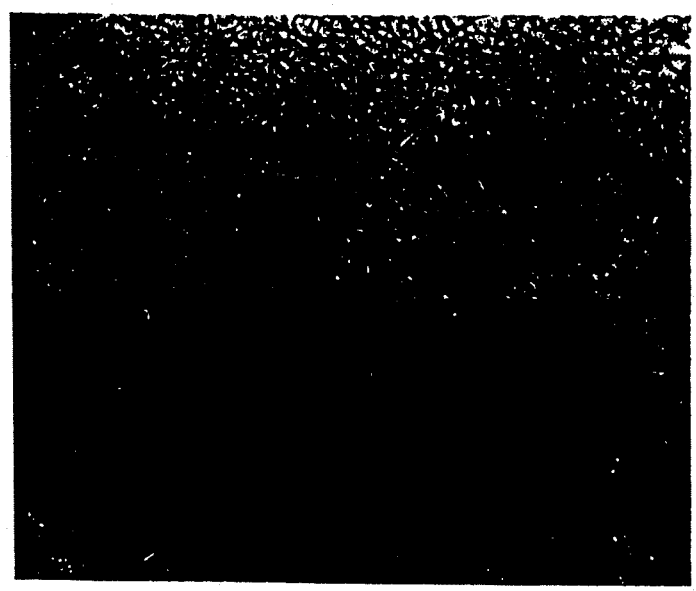
FIG. 12a is an optical micrograph of a 0.025 inch NiTi alloy explosively bonded to an LCS substrate according to the method of the present invention.
Figure 12B:
FIG. 12b is an optical micrograph of a 0.025 inch NiTi alloy explosively bonded to an LCS substrate according to the method of the present invention.

The explosive welding parameters for this Example 5 were the same as for Example 3, and the NiTi alloy again had a thickness of about 0.025 inch (0.64 mm). Micrographs of the welded composite show that welds between the NiTi alloy and the LCS workpiece are very good and exhibit substantial LCS plastic flow at the interface. No melt or shear cracking was seen at the interface. X-ray diffraction analysis indicated that no phase transition had occurred. The optical micrographs of FIGS. 12a and 12b show that the bond morphologies for the NiTi welded samples of this Example 5 are substantially flat. Moreover, FIGS. 12a and 12b show that the NiTi alloy clearly was bonded to the LCS substrate using the conditions stated in Example 5. The average Vickers microhardness value for the NiTi alloy after welding was about 353 HV, whereas the annealed NiTi sample had a Vickers microhardness value of about 285 HV.

EXAMPLE 6

Figure 13A:
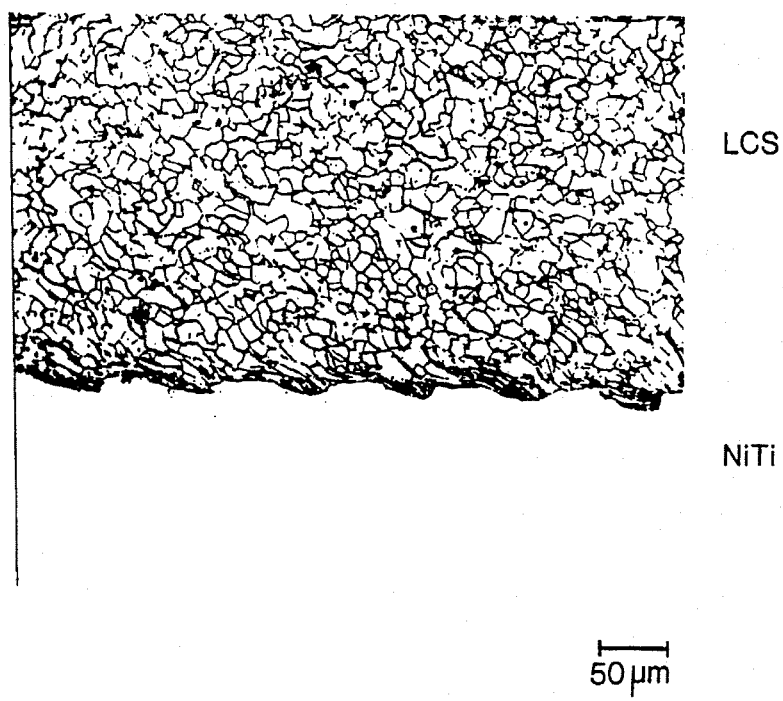
FIG. 13a is an optical micrograph of a 0.025 inch NiTi alloy explosively bonded to an LCS substrate according to the method of the present invention.
Figure 13B:
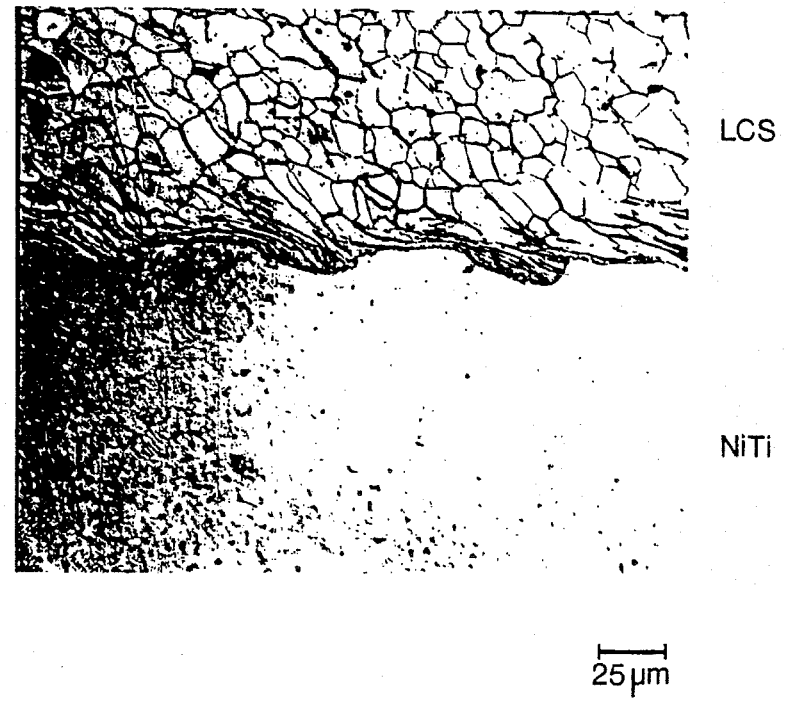
FIG. 13b is an optical micrograph of a 0.025 inch NiTi alloy explosively bonded to an LCS substrate according to the method of the present invention.

The explosive-welding parameters for this Example 6 were modified from that of Example 5 by (1) increasing the explosive frame height to 1.75 inches (44.5 mm), and (2) decreasing the stand-off distance to about 0.125 inch (3.18 mm). Again, the NiTi sample had a thickness of about 0.025 inch (0.64 mm). These bonding parameters produced what presently appears to be the strongest interface as determined by metallography. Moreover, the bond morphology was a uniform wave as shown by FIGS. 13a and 13b. No shear cracks were seen in the NiTi, and X-ray diffraction analysis showed that no phase transition had occurred during the bonding process. The average Vickers microhardness value for the NiTi alloy after welding was about 361 HV, whereas the average Vickers microhardness value for the annealed NiTi sample was about 285 HV.

VI. Post-Welding Heat Treatment

Post-welding heat treatments may be devised to retain or increase the cavitation erosion resistance of NiTi alloys explosively bonded to steel workpieces. Post-welding heat treatments have been tried with the NiTi/metal composites. Initial heat treatments were performed at temperatures of 300° C., 400° C., 500° C., 600° C. and 700° C. The post-welding heat treatment at 300° C. was conducted for a period of about 1 hour. The remaining heat treatment procedures were conducted for a period of about 15 minutes.

The average as-welded microhardness value for the samples used in the post-weld heat treatment studies was about 331 HV. This value increased as a result of heating at about 300° C. up to a value of about 337 HV. However, the microhardness values thereafter decreased to below the average as-welded microhardness. More specifically, the microhardness value decreased down to about 276 HV at 500° C., and down to about 252 HV at 600° C. The average microhardness value at 700° C. was about 263 HV. Moreover, little increase was observed for the erosion resistance of the welded NiTi alloys, except for the sample that was heated at 500° C., which exhibited a significant increase in erosion resistance as a result of the post-weld heat treatment. Hence, a presently preferred post-weld treatment comprises heating the welded composite from about 300° C. to about 500° C. for a period of time of less than about 1 hour, and preferably from about 15 minutes to about 1 hour.

VII. Conclusion

A NiTi alloy having a Ni content of from about 55 weight percent to about 60 weight percent, preferably about 55.8 weight percent, is uniquely resistant to LDE and cavitation erosion. Initial explosive bonding parameters have been determined that allow these NiTi alloys to be bonded to a metal steel or low-carbon steel, such as workpieces. The bond between the NiTi alloy and the metal workpiece is quite good as shown by optical micrographs of the weld interface. Furthermore, NiTi alloys may be bonded to the steel workpiece in a manner that avoids forming shear cracks and a brittle NiTi intermetallic. Both flat interfaces and wavy welded interfaces can be formed by selecting the appropriate explosive bonding parameters. X-ray diffraction analysis of the NiTi metal composite shows that no phase transition occurs in the NiTi alloy sample during the explosive bonding process. Hence, the NiTi-metal composite is still highly resistant to cavitation erosion and LDE. An increase in the hardness of the NiTi sample occurs as a result of the bonding process.

The present invention has been described with reference to preferred embodiments. Other embodiments of the invention will be apparent to those of skill in the art from the consideration of this specification or practice of the invention disclosed herein. It is intended that the specification and examples be considered as exemplary only, with the true scope and spirit of the invention being indicated by the following claims.

We claim:

1. A method for making a NiTi-metal workpiece, comprising the steps of:

providing a metal workpiece having a surface area;

providing a sufficient amount of a NiTi alloy to at least partially cover the surface area of the workpiece, the alloy having a nickel content of from about 55 weight percent to about 60 weight percent; and explosively bonding the NiTi alloy to the workpiece.

2. The method according to claim 1 wherein the step of providing a metal workpiece comprises providing a steel workpiece in the shape of at least a portion of a hydraulic device.

3. The method according to claim 1 wherein the nickel content of the NiTi alloy is sufficient so that the NiTi alloy is substantially completely in the β phase at or about room temperature.

4. The method according to claim 1 wherein the nickel content is at least about 55.8 weight percent.

5. The method according to claim 1 and further comprising the step of annealing the NiTi alloy at a temperature of from about 600° C. to about 800° C. for a sufficient period of time to anneal the NiTi alloy before the step of explosively bonding.

6. The method according to claim 5 wherein the NiTi alloy is annealed at a temperature of about 700° C. for a period of time of from about ten minutes to about fifteen minutes.

7. The method according to claim 1 and further comprising the step of heating the NiTi alloy to a temperature of from about 250° C. to about 350° C. before the explosive bonding step.

8. The method according to claim 1 wherein 6% ANFO is used as an explosive to explosively bond the NiTi alloy to the workpiece.

9. The method according to claim 8 wherein the stand-off distance is from about 0.125 inch to about 0.150 inch.

10. The method according to claim 8 wherein the stand-off distance is about 0.125 inch.

11. A method for forming a workpiece, comprising the steps of:
providing a metal workpiece having a surface area;
providing a NiTi alloy having a nickel content of from about 55 weight percent to about 60 weight percent;
heating the NiTi alloy to a temperature of from about 250° C. to about 350° C.; and
explosively bonding the NiTi alloy to the workpiece to cover at least a portion of the surface area with the NiTi alloy.

12. The method according to claim 11 wherein the step of heating comprises heating the NiTi alloy to a temperature of about 300° C.

13. The method according to claim 11 wherein the nickel content is sufficient so that the NiTi alloy is substantially completely in a β phase at or about room temperature.

14. The method according to claim 11 wherein the nickel content is about 55.8 weight percent.

15. A method for forming a workpiece, comprising the steps of:
providing a metal workpiece having a surface area;
providing a NiTi alloy having a nickel content of from about 55 weight percent to about 60 weight percent;
annealing the NiTi alloy for a period of time of from about ten minutes to about fifteen minutes at a temperature of from about 600° C. to about 800° C.; and
explosively bonding the NiTi alloy to the workpiece to cover at least a portion of the surface area with the NiTi alloy.

16. The method according to claim 15 wherein the nickel content of the NiTi alloy is about 55.8 weight percent.

17. The method according to claim 15 wherein the step of annealing comprises annealing the NiTi alloy at about 700° C. for a period of time of about fifteen minutes.

18. A method for forming hydraulic machinery that is resistant to erosion, comprising the steps of:
providing a steel workpiece in the shape of at least a portion of a hydraulic device, the workpiece having a surface area that is exposed to repeated cavitation and liquid droplet erosion during operation of the machines;
providing a NiTi alloy plating member having a thickness of from about 0.01 inch to about 1.0 inch wherein the nickel content of the alloy is from about 55 weight percent to about 60 weight percent;
annealing the NiTi alloy at a temperature of from about 650° C. to about 750° C. for a period of time of from about ten minutes to about fifteen minutes;
heating the NiTi alloy to a temperature of from about 275° C. to about 325° C.; and
explosively bonding the annealed, heated NiTi alloy member to the workpiece to cover at least a portion of the surface area with the NiTi alloy.

19. The method according to claim 18 wherein the nickel content of the NiTi alloy is about 55.8 weight percent, the NiTi alloy is annealed at a temperature of about 700° C. for a period of about fifteen minutes, and the NiTi alloy is heated to a temperature of about 300° C. after the step of annealing and before the step of explosively bonding.

20. The method according to claim 18 wherein the step of explosively bonding comprises the steps of:
providing an explosive frame adjacent to the workpiece;
positioning the annealed NiTi alloy inside the explosive frame so that the NiTi alloy is from about 0.1 to about 0.2 inch away from the workpiece, thereby providing a stand-off distance;
placing from about 3 pounds to about 5 pounds per square foot of NiTi alloy of an explosive in the explosive frame; and
detonating the explosive.

21. A method for making a NiTi-metal workpiece, comprising:
providing a metal workpiece having a surface;
providing a sufficient amount of a NiTi alloy to at least partially cover the surface of the workpiece, the alloy having a nickel content of from about 55 weight percent to about 60 weight percent;
annealing the NiTi alloy at a temperature of from about 600° C. to about 800° C. for a sufficient period of time to anneal the NiTi alloy; and
heating the NiTi alloy to a temperature of from about 250° C. to about 350° C. and thereafter explosively bonding the NiTi alloy to the workpiece.

22. A method for making a NiTi-metal workpiece comprising the steps of:
providing a metal workpiece having a surface;
providing a sufficient amount of a NiTi alloy to at least partially cover the surface of the workpiece, the alloy having a nickel content of from about 55 weight percent to about 60 weight percent;
providing an explosive frame adjacent to the workpiece;
positioning the NiTi alloy inside the explosive frame so that the NiTi alloy is from about 0.1 to about 0.2 inch away from the workpiece;
placing from about 3 pounds to about 5 pounds per square foot of NiTi alloy of an explosive in the explosive frame; and
explosively bonding the NiTi alloy to the workpiece.

23. A method for forming a workpiece, comprising the steps of:
providing a metal workpiece having a surface;
providing an explosive frame adjacent to the workpiece;
providing a NiTi alloy having a nickel content of from about 55 weight percent to about 60 weight percent;
positioning the NiTi alloy inside the explosive frame so that the NiTi alloy is from about 0.1 to about 0.2 inch away from the workpiece;
placing from about 3 pounds to about 5 pounds per square foot of NiTi alloy of an explosive in the explosive frame;
heating the NiTi alloy to a temperature of from about 250° C. to about 350° C.; and
explosively bonding the NiTi alloy to the workpiece to cover at least a portion of the surface of the workpiece with the NiTi alloy.

24. A method for forming a workpiece, comprising the steps of:

providing a metal workpiece having a surface;

providing an explosive frame adjacent the workpiece;

providing a NiTi alloy having a nickel content of from about 55 weight percent to about 60 weight percent;

annealing the NiTi alloy for a period of time of from about ten minutes to about fifteen minutes at a temperature of from about 600° C. to about 800° C.;

positioning the NiTi alloy inside the explosive frame so that the NiTi alloy is from about 0.1 to about 0.2 inch away from the workpiece;

placing from about 3 pounds to about 5 pounds per square foot of NiTi alloy of an explosive in the explosive frame; and explosively bonding the NiTi alloy to the workpiece to cover at least a portion of the surface with the NiTi alloy.

* * * * *